United States Patent [19]

Stone

[11] Patent Number: 4,504,754
[45] Date of Patent: Mar. 12, 1985

[54] ELECTRIC MOTOR

[75] Inventor: Thomas W. Stone, Owosso, Mich.

[73] Assignee: Universal Electric Company, Owosso, Mich.

[21] Appl. No.: 425,415

[22] Filed: Sep. 28, 1982

[51] Int. Cl.³ .............................................. H02K 5/16
[52] U.S. Cl. ......................................... 310/90; 310/89
[58] Field of Search ................................... 310/88-90, 310/42, 254

[56] References Cited

U.S. PATENT DOCUMENTS

| 2,448,500 | 8/1948 | Turner | 310/90 UX |
| 2,792,512 | 5/1957 | Koch | 310/90 X |
| 3,270,226 | 8/1966 | McMillan, Jr. | 310/90 |
| 3,391,290 | 7/1968 | Hahndorf et al. | 310/90 X |
| 3,789,251 | 1/1974 | King | 310/90 X |
| 3,794,869 | 2/1974 | Apostoleris | 310/90 |
| 4,186,319 | 1/1980 | Dochterman | 310/90 X |

Primary Examiner—Donovan F. Duggan
Attorney, Agent, or Firm—Barnes, Kisselle, Raisch, Choate, Whittemore & Hulbert

[57] ABSTRACT

An electric motor comprising a casing, a stator mounted in the casing, a rotor, and end members rotatably mounting the rotor with respect to the stator. At least one of the end members is cast and comprising an integral hub a plurality of radially inwardly extending portions from the inner surface of the hub defining a bearing seat and a plurality of axially extending ribs on the inner surface of the hub having slots machined therein defining a surface in each rib that is accurately spaced axially with respect to the seat. A substantially flat spring member is positioned so that its annular periphery engages the surfaces. The spring member has radially inwardly extending fingers engaging the bearing in the seat.

6 Claims, 9 Drawing Figures

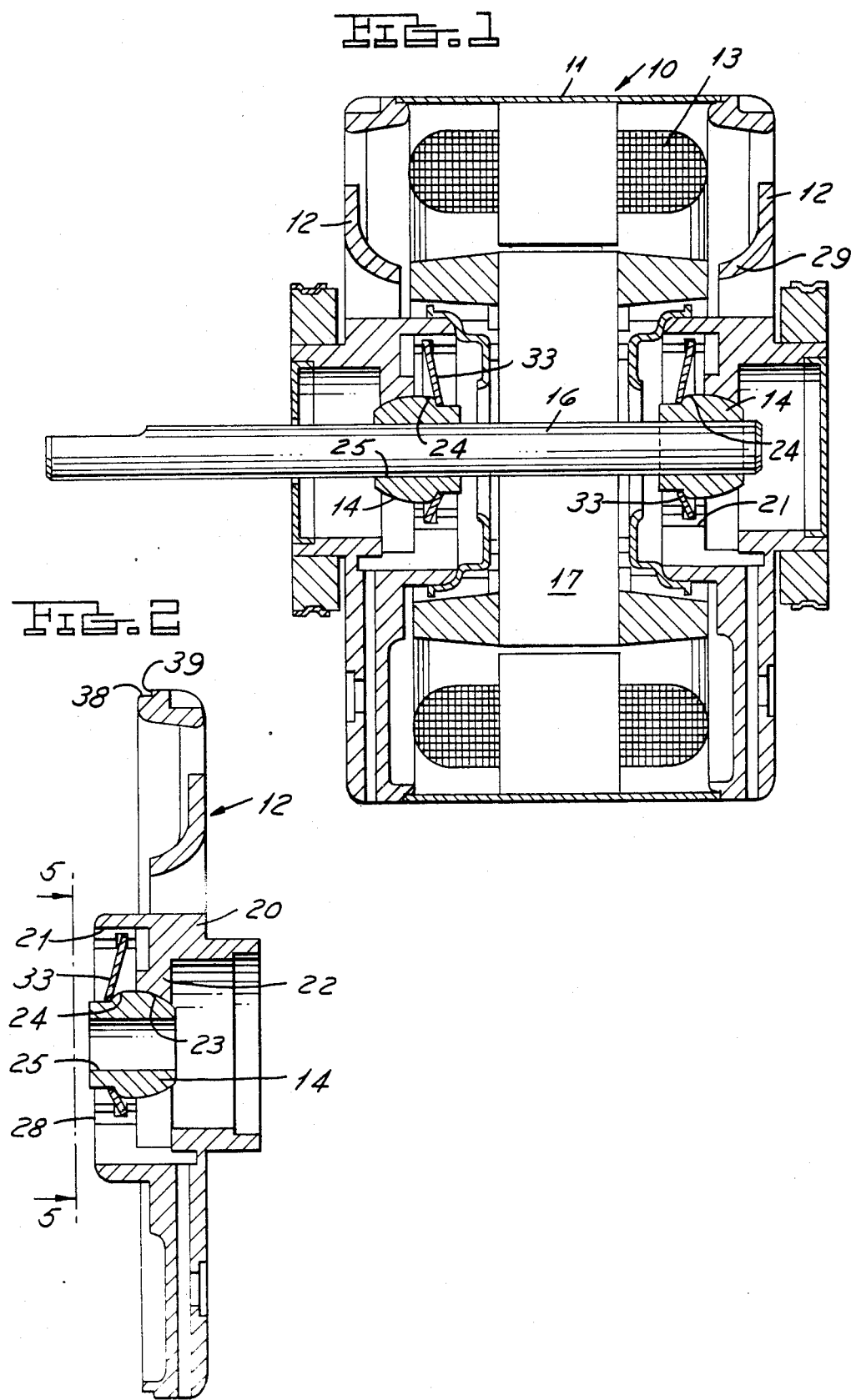

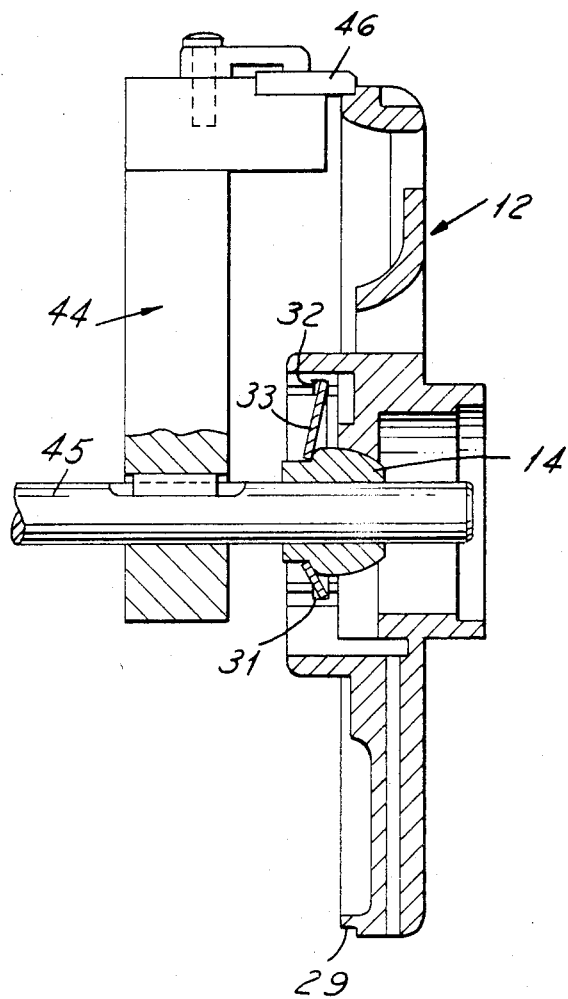

ELECTRIC MOTOR

This invention relates to electric motors and particularly to electric motors utilizing self-aligning bearings.

BACKGROUND AND SUMMARY OF THE INVENTION

In the manufacture of electric motors, particularly for use in the air moving industry, it is desirable to utilize self-aligning bearings in order to control alignment of the parts and provide the desired air gap between the stator and rotor.

One common type of bearing that has been used is known as a sleeve bearing which utilizes a spherical seat against which a spherical bearing is urged by a spring. Do to the wide range of horsepower outputs in a multiple speed motor, it is necessary to provide sufficient spring force to hold the self-aligning bearing in place under load ranges of two to 300%. The spring forces act in two directions in that the low horsepower starting is adversely affected when the spring forces are increased to handle heavy loads. The problem is further compounded when normal manufacturing tolerances add to the displacement of the assembled spring to the bearing. Further, the use of a coil spring in an effort to reduce the effective assembly tolerance interferes with the use of wicking materials and the automated assembly of the motor.

In U.S. Pat. Nos. 3,966,278 and 4,090,749 an electric motor is shown with self-aligning bearings wherein the end member is formed with an enlarged opening and a bearing seat is defined by radially inwardly extending portions. A high-rate spring is inserted and has a central annular portion for engaging the bearing.

Such an arrangement necessitates that the end member be made with a very large opening and is difficult to assemble. Where the end member is die cast, complex cores are required. In addition, the large opening precludes the use of conventional standard motor mounting structures.

Accordingly, among the objectives of the present invention are to provide an electric motor with a self-aligning bearing that incorporates close dimensional tolerances and eliminates normal die cast tolerances; which minimizes variation in starting torques; which provides unobstructed channels for ease of assembly of oil reservoir material; which permits variation in the holding forces by simple techniques during manufacture and which utilizes a standard size external hub permitting a conventional mounting system to be used.

In accordance with the invention, the electric motor comprises a casing, a stator mounted in the casing, a rotor, and end members rotatably mounting the rotor with respect to the stator. The end members are die cast and comprise an integral hub having a plurality of radially inwardly extending portions defining a bearing seat, a plurality of axially extending ribs on the inner surface of the hub having slots machined therein defining a surface in each rib that is accurately spaced axially with respect to the seat. A substantially flat spring member is positioned so that its annular periphery engages the surfaces and has radially inwardly extending fingers engaging the bearing.

DESCRIPTION OF THE DRAWINGS

FIG. 1 is a longitudinal sectional view of an electric motor embodying the invention.

FIG. 2 is a sectional view of an end member utilized in the motor shown in FIG. 1.

FIG. 9 is a view similar to FIG. 7 showing a further step in making an end member.

DESCRIPTION

Figure 3:
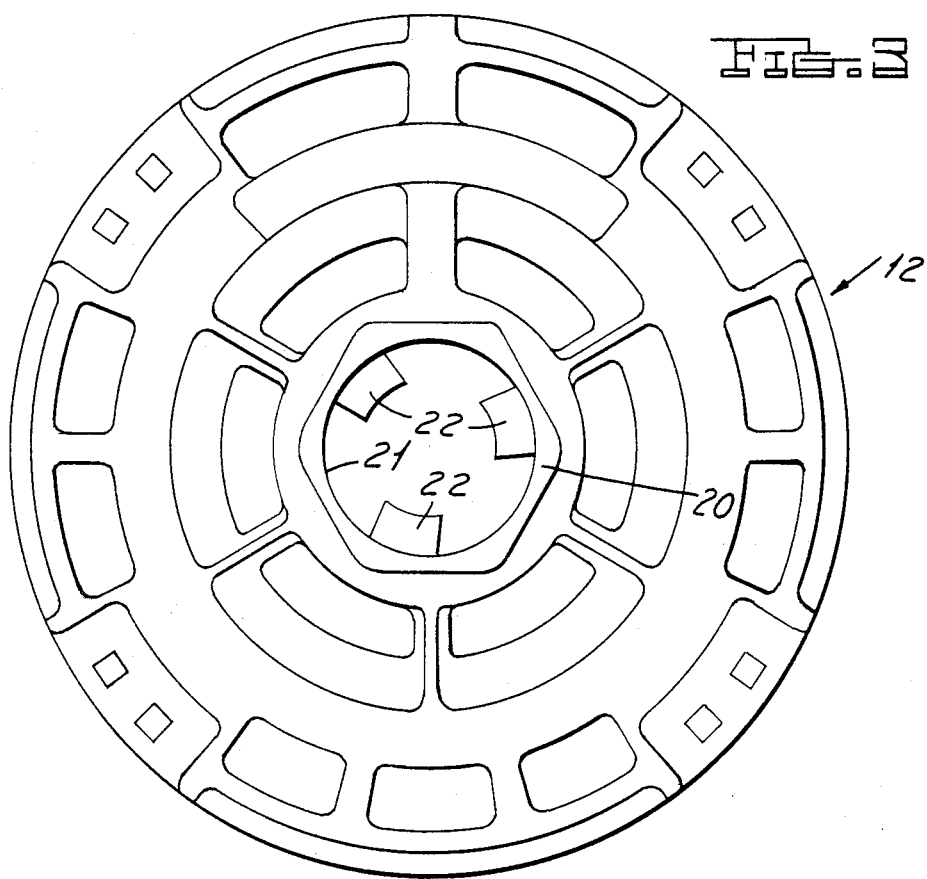
FIG. 3 is an end view of the end member shown in FIG. 2 taken from the right.

Referring to FIG. 1, the electric motor embodying the invention comprises a frame 10 that includes a cylindrical casing or shell 11 preferably made of metal and die cast end members 12 held in assembled relation by bolts extending through the motor. The shell 11 supports a stator 13 and the end members 12 have bearings 14 for supporting the shaft 16 of the rotor 17.

In accordance with the invention, each end member 12 is cast of metal to define a hub 20 that has an exterior surface of standard configuration permitting the use of standard mounting structures. The inner surface 21 of the hub 20 is formed with radially inwardly extending seat portions 22 defining concave spherical seats 23 for receiving the spherical surface 24 of bearing 14. The bearing 14 has an opening 25 and a radial surface 26 with an annular convex surface 27 joining the radial surface 26 to the spherical surface 24.

The hub 20 is further formed with axially extending cast ribs 28.

Each end member 12 is formed with venturi shaped annular walls 29 and annular rows of openings 30 in accordance with conventional practice.

In the manufacture of the motor as presently described, after casting, the ribs 28 of the end member are formed with slots 31 by machining. Slots 31 include radial surfaces 32 facing the seats 23 and accurately positioned axially with respect to the seats 23.

A spring member 33 of spring material which is flat is provided in the slots 31. As shown the spring member 33 includes a solid annular peripheral portion 34 and a plurality of radially inwardly extending spring fingers 35 that engage the radial surface 26 of the bearing. The periphery of the springs is provided with notches 36. In assembly, the bearing 14 is first engaged with the seats 23, the spring 33 is brought into position with the notches 36 aligned with the ribs 28 and then an annular tool is provided which applies an axial force to the periphery of the spring 33 to flex it against the radial surface 26 of the bearing 14 until the periphery of the spring 30 moves into the plane of the slots 31. Thereafter the tool is rotated, rotating the spring 33 to bring the peripheral edge of the spring 33 into engagement with the accurate surfaces 32 of the slots 31. The spring 33 is preferably formed with spaced pairs of locating projections 37 in the form of dimples to assist in locating the spring and inhibit subsequent rotation of the spring 33.

Figure 4:
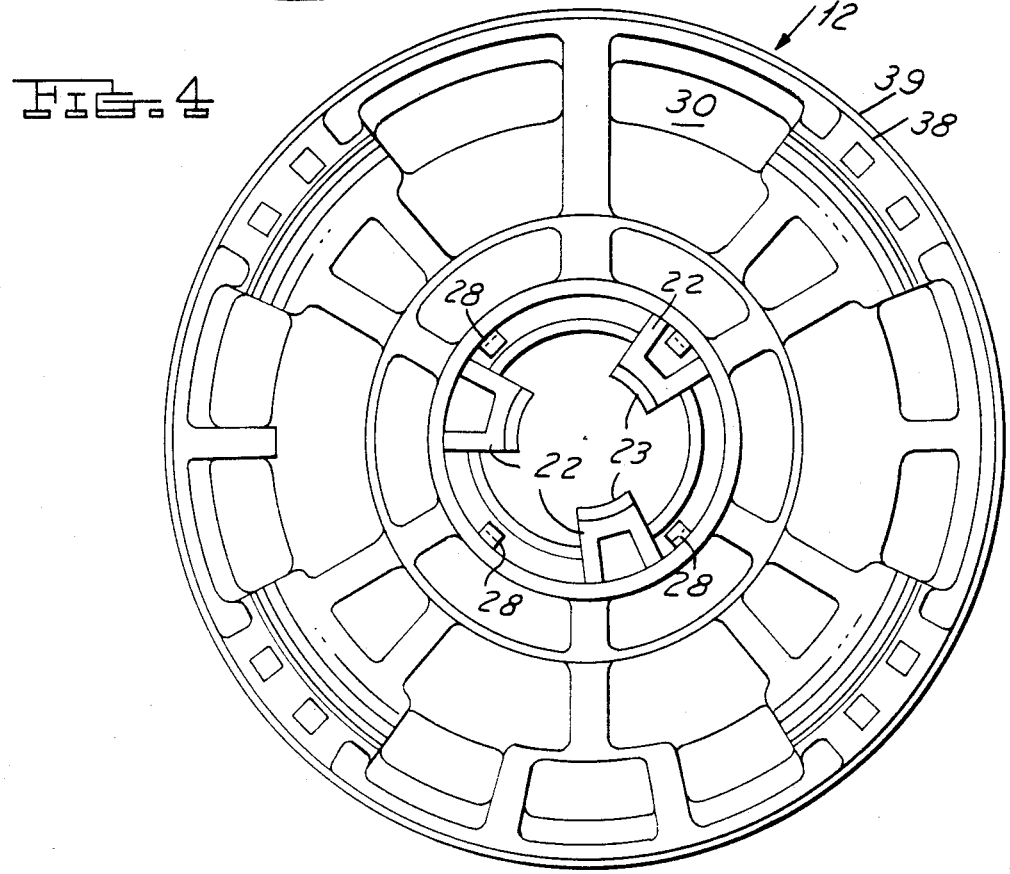
FIG. 4 is an end view of the end member shown in FIG. 2 taken from the left.
Figure 5:
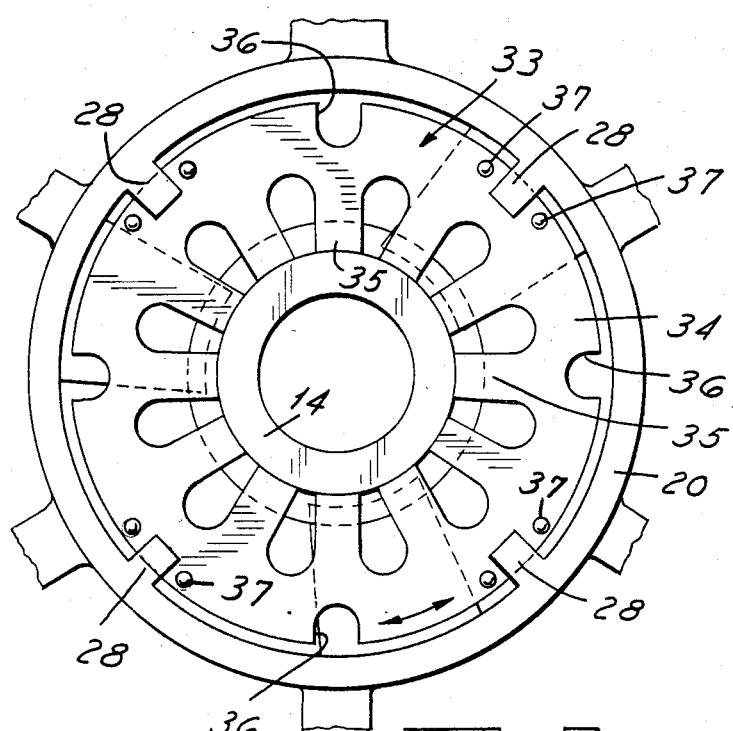
FIG. 5 is a fragmentary sectional view on an enlarged scale taken along the line 5—5 in FIG. 2 with parts being broken away.
Figure 6:
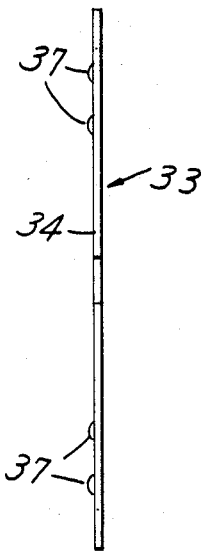
FIG. 6 is an end view of a spring member utilized in the motor.

As shown in FIGS. 2 and 4, each die cast end member 12 is further formed with an axial surface 38 and a radial surface 39. The ends of the shell 11 are machined so that each end defines a radial plane, the plane at one end being parallel to the plane at the other end of the shell. The shell is also sized so that the inner surface of the shell is cylindrical. The axial and radial surfaces 38, 39 of the end member 12 engage the corresponding axial and radial surfaces of the shell 11.

As presently described, the concentricity of the axial surface 38 on the end member 12 is insured by forming it with respect to the opening 25 in the bearing 14 after the bearing 14 has been inserted in the end member 12.

Figure 7:
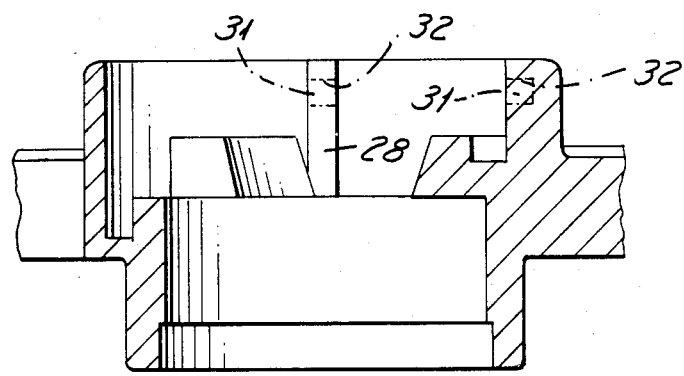
FIG. 7 is a fragmentary sectional view of an end member after being cast.
Figure 8:
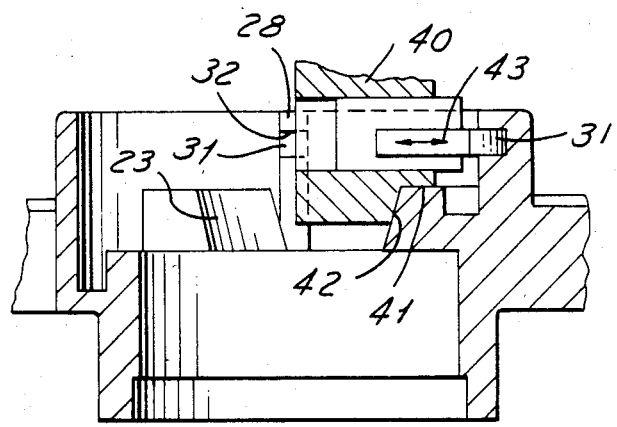
FIG. 8 is a view similar to FIG. 7 showing a step in making an end member.

FIG. 7 shows an end member 12 prior to formation of the slots 31. Referring to FIG. 8, there is shown an apparatus for accurately forming the surfaces of the slots 31. The apparatus comprises a fixture 40 that has locating surfaces 41, 42 engaging portions of the seat portions 22, 23. A tool 43 forms part of fixture 40 so that the tool 43 is accurately positioned relative to the engaging portions. When the die cast member 12 and the tool are rotated relative to one another, the surfaces 32 of the slots 31 are accurately formed with respect to the bearing seats 23.

Referring to FIG. 9, an apparatus is shown for accurately forming the axial peripheral surface 38 on the die cast end member 12 and comprises a fixture 44 that includes a locating shaft 45 that engages the bearing opening 25 after the bearing 14 has been assembled in the end member 12. The fixture 44 includes a tool 46 is accurately positioned concentrically with respect to the shaft 45 so that when the tool 46 is rotated relative to the end member 12, the axial surface 29 is accurately formed in concentric relation to the opening in the bearing 14.

When it is desired to utilize the same die cast member with a motor having different starting characteristics, the identical end member can be used except at the position of the slots 30, axially with respect to the bearing seats 23, can be changed to provide a lesser or greater spring force as may be required.

I claim:

1. An electric motor comprising
   a casing,
   a stator mounted in said casing,
   a rotor,
   and end members rotatably mounting said rotor with respect to said stator,
   at least one of said end members being cast and comprising an integral hub having a plurality of radially inwardly extending portions defining a bearing seat,
   a plurality of axially extending ribs on the inner surface of said hub,
   said ribs having slots machined therein defining a surface in each rib that is accurately spaced axially with respect to the seat,
   and a substantially flat spring member having a solid annular peripheral portion engaging said surfaces,
   said spring member having a plurality of fingers extending radially inwardly from said annular peripheral portion and having free ends engaging said bearing,
   said annular peripheral portion having notches in the periphery thereof whereby said spring is placed in position with the notches aligned with said ribs and rotated to cause said annular peripheral portion to engage said surfaces of said ribs.

2. The electric motor set forth in claim 1 wherein said bearing includes a radial surface engaged by the free ends of said radially inwardly extending fingers.

3. The electric motor set forth in claim 2 wherein said bearing includes an annular convex surface joining said radial surface and merging with said spherical surface of said bearing.

4. The electric motor set forth in claim 1 wherein the space between said radially extending portions of the end member is substantially unobstructed.

5. The electric motor set forth in claim 1 wherein said cast end member includes an axially extending peripheral surface which is in accurate concentric relation with respect to the axis of the opening in said bearing.

6. The electric motor set forth in claim 1 including locating projections on said spring cooperating with one of said ribs to inhibit rotation of said spring.

* * * * *